United States Patent
Brandlhuber et al.

(10) Patent No.: US 11,597,418 B2
(45) Date of Patent: Mar. 7, 2023

(54) METHOD FOR DETERMINING AN ELEMENT CHARACTERISTIC OF A RAILROAD ELEMENT

(71) Applicant: KONUX GMBH, Munich (DE)

(72) Inventors: Christian Brandlhuber, Munich (DE); Vlad Ilie Lata, Munich (DE); Scott Muller, Munich (DE); Ole Tommy Vorren, Munich (DE)

(73) Assignee: KONUX GMBH, Munich (DE)

( * ) Notice: Subject to any disclaimer, the term of this patent is extended or adjusted under 35 U.S.C. 154(b) by 365 days.

(21) Appl. No.: 16/760,470

(22) PCT Filed: Oct. 30, 2017

(86) PCT No.: PCT/EP2017/077760
§ 371 (c)(1),
(2) Date: Apr. 30, 2020

(87) PCT Pub. No.: WO2019/086097
PCT Pub. Date: May 9, 2019

(65) Prior Publication Data
US 2022/0153326 A1    May 19, 2022

(51) Int. Cl.
| | | |
|---|---|---|
| B61L 23/04 | (2006.01) | |
| B61L 1/02 | (2006.01) | |
| B61L 27/53 | (2022.01) | |
| B61L 27/57 | (2022.01) | |
| G06N 20/00 | (2019.01) | |

(52) U.S. Cl.
CPC ............ *B61L 23/047* (2013.01); *B61L 27/53* (2022.01); *B61L 27/57* (2022.01); *G06N 20/00* (2019.01)

(58) Field of Classification Search
CPC ........ B61L 23/047; B61L 27/53; B61L 27/57; G06N 20/00
See application file for complete search history.

(56) References Cited

U.S. PATENT DOCUMENTS

| | | | |
|---|---|---|---|
| 5,529,267 A | | 6/1996 | Boyle |
| 5,743,495 A | * | 4/1998 | Welles, II ............. B61L 23/047 246/169 R |
| 2014/0277824 A1 | * | 9/2014 | Kernwein ............. B61L 23/044 701/1 |

FOREIGN PATENT DOCUMENTS

| | | |
|---|---|---|
| CN | 101242985 A | 4/2008 |
| CN | 101954916 A | 1/2011 |
| CN | 104034805 A | 9/2014 |

(Continued)

OTHER PUBLICATIONS

Chinese Office Action dated Jan. 19, 2022 for corresponding CN Application No. 201780096398.5, and English translation thereof.

(Continued)

*Primary Examiner* — Alesa Allgood
(74) *Attorney, Agent, or Firm* — Tarolli, Sundheim, Covell & Tummino LLP

(57) ABSTRACT

The present invention provides a method for determining an element characteristic of at least one railroad element, comprising the steps of: providing a motion sensor (2) on the at least one railroad element (6); collecting motion data provided by the motion sensor (2), wherein the motion data is representing a motion characteristic of the railroad element (6) different from the element characteristic; determining the element characteristic on the basis of the motion data.

8 Claims, 1 Drawing Sheet

(56) References Cited

FOREIGN PATENT DOCUMENTS

| | | | |
|---|---|---|---|
| CN | 105203645 A | 12/2015 | |
| JP | H10264813 A | 10/1998 | |
| JP | 2002-104193 A | 4/2002 | |
| JP | 2018-114790 A | 7/2018 | |
| WO | 2012152575 A1 | 11/2012 | |
| WO | WO-2012152575 A1 * | 11/2012 | ............. B61L 1/166 |

OTHER PUBLICATIONS

International Search Report dated Jun. 27, 2018 for corresponding International Application No. PCT/EP2017/077760.
Gao, Yin, et al. "Characterization of railroad crosstie movements by numerical modeling and field investigation." Construction and Building Materials vol. 131 (2017), pp. 542-551.
Hodge, Victoria J., et al. "Wireless sensor networks for condition monitoring in the railway industry: A survey." IEEE Transactions on Intelligent Transportation Systems vol. 16, No. 3 (2015): 1088-1106.
Indian Examination Report dated May 28, 2021 for corresponding IN Application No. 202017020292, and English translation thereof.
Japanese Notice of Reasons for Refusal dated Apr. 28, 2021 for corresponding JP Application No. 2020-520054, and English translation thereof.
Chinese Office Action dated Jun. 30, 2021 for corresponding CN Application No. 201780096398.5, and English translation thereof.

\* cited by examiner

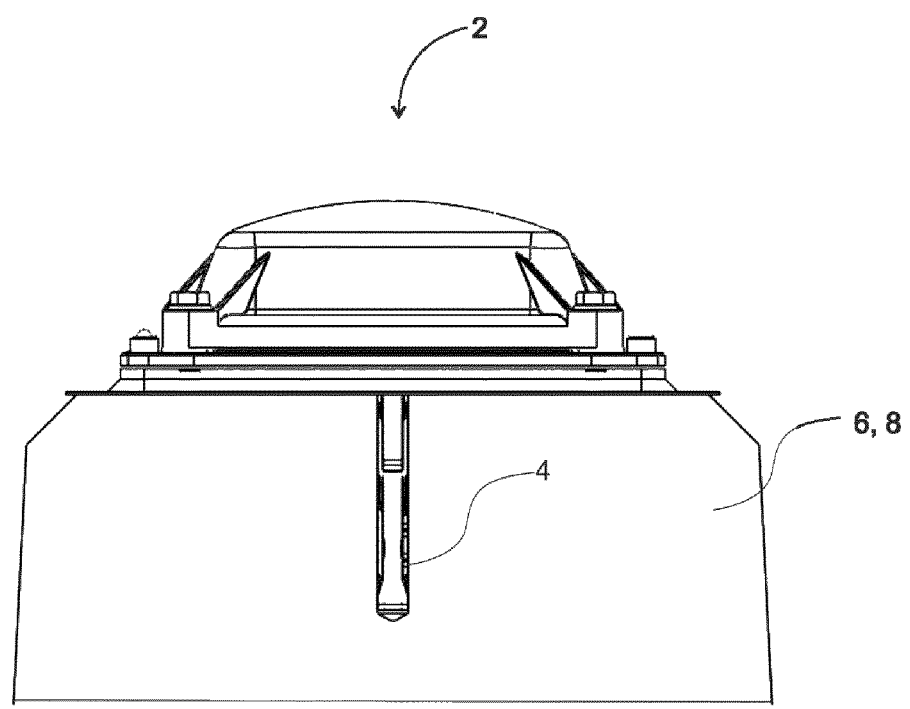

METHOD FOR DETERMINING AN ELEMENT CHARACTERISTIC OF A RAILROAD ELEMENT

RELATED APPLICATIONS

The present application is a U.S. National Stage application under 35 USC 371 of PCT Application Serial No. PCT/EP2017/077760, filed on 30 Oct. 2017.

The present invention relates to a method for determining an element characteristic of at least one railroad element.

Safety of travelling by railway is primarily ensured by maintenance carried out by humans, for example track checkers walking along the railroad, engineers using dedicated vehicles for analyzing the rails, engineers checking the passenger trains and so on. Typically, such checks are being performed in advance of a mean time to failure interval. Such a fixed interval maintenance approach produces unnecessary costs since during most checks no damage is detected. In addition, catastrophic damage is being risked since there is no tool in place which allows monitoring during normal operation and detection of deviations from a "normal state" which indicates that a damage of the railroad or the vehicle using the railroad has occurred.

It is an object of the present invention to provide a method for determining an element characteristic of at least one railroad element, wherein maintenance costs for running the railroad or a railroad vehicle (i.e. a vehicle using the railroad) can be reduced and/or the safety of the railroad and the railroad vehicle can be increased.

The inventors have found that an excessive movement of a crosstie or rail induced by a train using the rail may indicate deviations from the desired shape of the rail or/and deviations from the desired support provided by the track bed. Furthermore, the movement of a crosstie or rail induced by a train using the rail may indicate tensions induced in moving elements of a track switch. Still further, the inventors have found that e.g. vibrations caused by a damaged bearing on a wheel of a train or/and caused by a damaged wheel surface or damaged wheel shape may be measured indirectly by the measurement of the movement of the rail while the train with the damaged wheel bearing is using this rail. Movements of rails and track switches (turnouts) can transfer to crossties of the rail or of the track switch.

Amongst other things, these findings contributed to the present invention as a solution of the above object. According to the invention, the above object is solved by a method according to claim 1. Preferred embodiments of the invention are described in the dependent claims.

In an important aspect of the invention there is provided a method for determining an element characteristic of at least one railroad element, comprising the steps of: providing a motion sensor on the at least one railroad element; collecting motion data provided by the motion sensor, wherein the motion data is representing a motion characteristic of the railroad element different from the element characteristic; and determining the element characteristic on the basis of the motion data.

Determining an element characteristic of the at least one railroad element on the basis of the motion data, wherein the element characteristic of at least one railroad element represents a quantity different from the motion characteristic of the railroad element, provides the possibility to use a cheap and/or noise insensitive detector in the motion sensor and to use the motion data provided by the motion sensor in order to obtain indirectly the element characteristic.

It is preferred that the railroad element is a crosstie of a rail or of a track switch, a rail, or a track switch; or/and the motion characteristic of the railroad element is a characteristic of a point of the railroad element; or/and the motion characteristic of the railroad element is selected from a group comprising: acceleration, time-dependent acceleration, velocity, time-dependent velocity, position and time-dependent position; or/and the element characteristic of at least one railroad element is a characteristic of a point of the railroad element; and/or the element characteristic of at least one railroad element is selected from a group comprising: position, time-dependent position, position deviation from a reference position or an equilibrium position, time-dependent position deviation from a reference position or an equilibrium position, and a maintenance state indicator. The inventors have found that significant data with respect to railroad safety can be obtained when the railroad element is a crosstie of a rail or a track switch, or a rail, or a track switch. The particular examples for the motion characteristic and element characteristic allow to obtain information by a sensor without the need to stop the use of the railroad. It is in particular to be noted that a maintenance state indicator can be an element characteristic allowing the classification of maintenance/wear state of a rail or the vehicle using the railroad, wherein particularly advantageously the railroad does not need to be shut down during application of the method.

By providing the motion sensor on a crosstie, a rail or track switch, it is possible to obtain motion data which is significant for deviations hinting to faults present or developing in the railroad element or the vehicle using the railroad element and thus allow to determine maintenance intervals based on a present state of the railroad element or the vehicle using the railroad element, and thus avoiding unnecessary and costly maintenance checks.

A maintenance state indicator can be for example a binary indicator, for example broken/not broken railroad element or railroad vehicle, or can be an indicator with a finite number of separated values (for example, fully functional, maintenance needed, and broken) or can be a continuous value representing a lifetime, in particular a maintenance lifetime, of a railroad element or a railroad vehicle, in particular in in terms of a percentage, wherein 100% can represent a fully functional railroad element or fully functional railroad vehicle and 0% can represent a fully broken railroad element or fully broken railroad vehicle. The maintenance of the railroad element or the railroad vehicle can be scheduled on the basis of such a continuous maintenance state indicator, for example the maintenance is to be performed once the maintenance state indicator drops below 10%. These values and the use of percentages is a non-limiting example and different mappings of the maintenance indicator to a wear state of the railroad element or to a wear state of a rail vehicle can be found by a person skilled in the art in accordance with the particular application.

Preferably the step of determining the element characteristic of at least one railroad element comprises the steps of obtaining processed motion data by processing motion data and of determining the element characteristic of at least one railroad element on the basis of the processed motion data. By obtaining processed motion data, for example frequency filtered motion data, the accuracy in the determination of the element characteristic can be improved.

In a preferred embodiment, the step of obtaining processed motion data comprises subtracting a DC component of the motion data from the motion data. This allows a further improvement in the accuracy in the determination of the element characteristic.

Preferably the step of determining an element characteristic of at least one railroad element comprises using a machine learning algorithm. By using a machine learning algorithm, in particular a neuronal network algorithm, a very high degree of accuracy in the determination of the element characteristic can be obtained without modelling in an analytic way in advance the relationship between the motion data and element characteristic. In addition or as an alternative to a neuronal network algorithm, an algorithm based on a Hidden Markov Model or based on a Bayesian network using Scoring Functions could be used.

In a preferred embodiment, the method further comprises the steps of measuring reference data, preferably comprising: measuring directly or indirectly the element characteristic of the least one railroad element; collecting corresponding data from the motion sensor on the at least one railroad element; and using the reference data in the machine learning algorithm. By measuring reference data as set forth above the accuracy for each produced motion sensor or a batch of produced motion sensors can be improved while keeping the cost for calibration and model development low.

It is preferred that each motion sensor provides motion data from a plurality of motion detectors of the motion sensor; and that preferably all motion detectors provide motion data representing the same motion characteristic, in particular acceleration or time dependent acceleration, and that preferably at least one of the motion detectors has a different measuring range and/or a different resolution from another one of the motion detectors. Different motion detectors increase the accuracy of determination of the element characteristics, in particular when a machine learning algorithm is being used. The machine learning algorithm may combine (or "patch") the measuring ranges of the different detectors and the different measuring points due to the different resolutions in an optimal way such that the accuracy in determination of the motion characteristics is further increased.

In a preferred embodiment, the method further comprises the steps of providing at least one motion sensor on each railroad element of a plurality of railroad elements; collecting motion data provided by each of the motion sensors, wherein the motion data of each one of the motion sensors is representing a respective motion characteristic of the respective railroad element, the motion sensor is provided on, wherein the respective element characteristic of each one of the railroad elements represents a quantity different from the respective motion characteristic for the respective railroad element; determining a respective element characteristic of each one of the railroad elements on the basis of the respective motion data. By providing motion sensors on each railroad element or a plurality of railroad elements and collecting motion data provided by those motion sensors, data is being provided allowing to detect not only the element characteristic of a single railroad element but also to detect quantities related to the whole railroad itself. With respect to the detection of maintenance state indicators, the provision of a motion sensor in the bent of the railroad may provide information relating to the quality or condition of the surface of the vehicle wheels (out-of-round or out-of-balance wheels) or bearing failures of the vehicle wheels in a lateral direction due to the lateral acceleration and the provision of the motion sensor on a high-speed section of the railroad may provide information relating to bearing failures caused for example by reduced bearing gaps due to heat generation and so on.

In a further preferred embodiment, the element characteristic of at least one railroad element is a maintenance state indicator; wherein the step of determining an element characteristic of at least one railroad element comprises using a machine learning algorithm; and wherein the method further comprises the steps of: measuring reference data, preferably comprising: providing a railroad element in a wear-state and providing a motion sensor on the railroad element in the wear-state; and collecting corresponding motion data from the motion sensor on the railroad element in the wear-state, wherein the change in the motion data is caused by a vehicle using the railroad element; and using the reference data in the machine learning algorithm to determine the maintenance state indicator indicative of a wear state of the railroad element. The machine learning algorithm allows to classify a maintenance state indicator relating to a railroad element without providing in advance an analytical model for the mapping of the motion data to a motion state indicator. This reduces the costs for the development of the analysis software.

In a different further preferred embodiment, the element characteristic of at least one railroad element is a maintenance state indicator; wherein the step of determining an element characteristic of at least one railroad element comprises using a trained machine learning algorithm; and wherein the method further comprises the steps of: measuring reference data, preferably comprising: providing a vehicle in a wear-state, the vehicle being adapted to use the railroad element, and measuring corresponding motion data from a motion sensor provided on a railroad element, wherein the change in the motion data is caused by the vehicle in the wear-state using the railroad element; and using the reference data in the machine learning algorithm to determine the maintenance state indicator indicative of a wear state of the vehicle. The machine learning algorithm allows to classify a maintenance state indicator relating to a vehicle using a railroad element without providing in advance an analytical model for the mapping of the motion data to a motion state indicator. This reduces the costs for the development of the analysis software.

In the following, embodiments of the invention will be described with reference to the accompanying FIG. 1, which shows a motion sensor used in the invention, wherein the railroad element is shown as a partial cross-section.

Sensor Arrangement

The arrangement of the motion sensor on a railroad element described in the following can be used in all embodiments of the present invention. In particular multiple motion sensors can be arranged on multiple railroad elements. In the following, a sensor is understood to be a unit/device adapted to provide motion data, in particular in computer readable form, wherein the motion data represents a motion characteristic.

A detector of the sensor is understood to be a device adapted to output a signal which represents a physical quantity which can be, and in most cases will be, a voltage, and there exists a function mapping the obtained signal (e.g. voltage) to values of the physical quantity. A detector can be an acceleration detector adapted to measure the acceleration in a given direction, for example in Cartesian coordinates any of the directions X, Y, or Z; or can be a multidimensional, in particular a three-dimensional, acceleration detector, wherein for example time-dependent data or maximum or minimum values or average values of acceleration can be provided by such a detector (e.g. simultaneously in the X, Y, and Z direction). Alternatively the velocity and/or position can be measured by the detector and the motion data provided by the sensor can represent velocity and/or position, each in a time-dependent fashion or as extreme values as discussed above.

For example, a motion detector detects a quantity representing a motion characteristic like acceleration, velocity, position or yaw and the motion sensor can transfer the raw output of the detector into analog or digital data representing the motion characteristic. The motion sensor 2 can send the data to a computing unit, e.g. a computer, by optical fiber, wired or wireless connection, thus the motion data is being collected. The computing unit can be a personal computer, a single-board computer or a server.

As shown in FIG. 1, the motion sensor 2 is preferably fixed to the railroad element 6, e.g. a crosstie 8, by dowels 4 placed in a bore in the railroad element 6, however, gluing, welding and similar techniques for fixing of the motion sensor are also possible. Due to the fixation of the motion sensor a motion detector of the motion sensor can detect the motion characteristic of the railroad element.

First Embodiment of the Invention

In the first embodiment, the motion sensor 2 is an acceleration sensor providing time-dependent acceleration data as motion data. The motion sensor 2 is provided on a crosstie. The element characteristic to be determined is the time-dependent position of a point on the crosstie (in the following, simply labelled position), for example one of the points where the detector touches the crosstie.

In this embodiment, the position may be determined as follows:
1. The motion data may be collected by a computing unit from the motion sensor, thus collected motion data is obtained. In particular motion data can be collected while a railroad vehicle passes the crosstie. Furthermore, motion data can be collected during a time period in which the railroad element is in a reference position (e.g. after mounting of the motion sensor) or an equilibrium position, for example when no train is passing by.
2. During a period where no train passes the crosstie, for example obtained on the basis of a timetable, a mean value M of the collected motion data, corresponding to zero acceleration, is determined. This period can also be obtained in good approximation at the leading edge during data acquisition, when a train is passing by, due to the fact that this acceleration values can be neglected in view of the desired accuracy.
3. From the collected motion data (i.e. from each collected data point in the motion data) the mean value M is being subtracted and thus a DC component is being removed from the motion data and processed motion data, here first processed time-dependent acceleration data, is obtained.
4. The starting point of relevant acceleration data is determined by comparing a moving average of processed time-dependent acceleration data with a threshold zero value, wherein a suitable threshold zero value and a width of the window used for the moving average can be obtained by experiments.
5. The time-dependent acceleration data is double integrated using a quadrature technique. This creates time-dependent displacement data which represent an element characteristic of the railroad element.

In this way, acceleration data can be transformed into displacement data providing valuable information, for example about a vertical displacement of a crosstie during a train passing event. Furthermore, displacement data obtained in step 5 above can be compared to the reference position or equilibrium position in order to provide a position deviation, preferably in a time-dependent manner, based on which wear or damage of the railroad can be determined.

Second Embodiment of the Invention

In a second embodiment, the motion sensor 2 is preferably an acceleration sensor providing time-dependent acceleration data as motion data. The motion sensor 2 is preferably provided on a crosstie of the railroad. The element characteristic to be determined is preferably the time-dependent position of a point on the crosstie (in the following referred to as "position"), for example one of the points where the sensor touches the crosstie.

Alternatively or in addition, motion sensor 2 may be provided on at least one other railroad element 6, in particular a rail or a track switch or on an associated crosstie of a rail or a track switch. Furthermore, in this embodiment of the present invention a computing unit (not shown) is provided which comprises an artificial machine learning algorithm, for example a neuronal network, adapted to determine the element characteristic of the railroad element. If a Neuronal network is used, it can be based on nonlinear autoregressive exogenous model (NARX) or on a feedforward neural network (FFNN), or on a recurrent neural network (RNN) or on a long short-term memory (LSTM). Alternatively, an algorithm based on a Hidden Markov Model or based on a Bayesian network using Scoring Functions could be used.

The motion sensor 2 may comprise a single motion detector, however the use of multiple motion detectors is preferred to increase precision and reliability or the measurements. A motion detector is a device adapted to detect a particular physical quantity, like acceleration, velocity, position, yaw, magnetic field, electric field and so on. A motion sensor on the other hand is adapted to provide motion data, wherein the motion data represents a motion characteristic of the railroad element. For example, a motion detector detects a quantity representing a motion characteristic like acceleration, velocity, position or yaw and the motion sensor can transfer the raw output of the detector into analog or digital data representing the motion characteristic of the railroad element. The motion sensor can send the data to the computing unit by optical fiber, wired or wireless connection.

The motion data provided by motion sensor 2 is being used by the computing unit as an input of an input layer of the neuronal network directly or the computing unit can process the obtained motion data and use such obtained processed motion data as the input of the input layer of the neuronal network. Processing motion data can comprise frequency filtering, selection of areas of interest and so on.

The output of an output layer of the neuronal network depending on the training chosen can either provide the element characteristic of the railroad element directly or can form a basis for the determination of the element characteristic of the railroad element. For example, in case the motion sensor provides acceleration data as the motion data, the output of the neuronal network can be a filtered version of the acceleration signal, for example a frequency filtered version of the input signal. Further, the output of the neuronal network can be the velocity of a point of the railroad element as a motion characteristic of the railroad element 6 such that the neuronal network essentially performs in such a case filtering and integration in time.

Further, the output of the neuronal network can be a maintenance state indicator indicative of a wear state of the railroad element or the vehicle using the railroad element.

In case the motion sensor comprises at least two motion detectors measuring different physical quantities, when only one physical quantity is changed, for example acceleration, the other sensors in most cases provide a signal as well. Using machine learning algorithms these "unexpected signals" can be used as an information source improving the accuracy of the output of the machine learning algorithms, in particular of a neuronal network.

Preferably each motion sensor 2 provides motion data from a plurality of motion detectors having different measuring ranges and/or different resolutions for the same physical quantity. Thus, the motion data provided by the sensor can be composed of multiple data streams, each stream containing motion data corresponding to the physical quantity detected by a single detector, wherein the resolutions and sampling rates in each of the streams may differ due to the properties of the detectors and associated sampling arrangements in the sensor. In particular in case of time-dependent acceleration, the machine learning algorithm may be able to "patch" the different measuring ranges and different resolutions improving the accuracy of the output of the machine learning algorithm in particular of the neuronal network algorithm.

In a preferred embodiment the method does not only relate to the determination of an element characteristic of a single railroad element but the element characteristic of multiple railroad elements can be determined by providing respective sensors on each railroad element to be monitored, by collecting the respective data from each motion sensor as described in the case of a single railroad element, and using the motion data collected from the motion sensors as input for the input layer of a neuronal network.

In particular, instead of the direct data of the motion sensors, a processed version of the motion data of some of or of each of the sensors can be used as input for the neuronal network. The neuronal network can either directly output data describing the element characteristic of the plurality of the railroad elements, for example a time-dependent position trace of a point of each railroad element or the output can be used as basis for such a determination, for example the output of the neuronal network can be filtered and corrected acceleration traces and the determination of the element characteristic of the plurality of the railroad elements can be a carried out by double time integration of the corrected acceleration traces.

Example Setup of the Neuronal Network

The motion data from the motion sensor(s) or the processed motion data as described above can be used as input of an input layer of a neuronal network.

In the first layer a n-tab window can be provided such that the measurement data is not only provided for a single time instance $t_i$ for processing to the neuronal network but also for time instances $t_{i-1}, t_{i-2}, \ldots, t_{i-n-1}$, wherein the indexes i, i−1, ... i−n−1 represent index of the sample motion data in time.

The data from the n-tab window is preferably fed to a layer of m-neurons with rectified linear unit (ReLu) activation functions.

The second layer of the neuronal network can be realized as a standard n-neuronal layer preferably again with ReLu activation functions.

In a preferred embodiment the neuronal network has a further third layer which recombines the m-signals from the second layer.

Learning/Training of the Neuronal Network

Basically different types of neuronal networks can by uses in the methods of the present invention. For example, the neuronal network may be trained by a learning process using reference data, and/or may be of a self-learning type which learns from date obtained during operation, and/or may simply operate on the basis of fixed tables or data stored in the system in advance.

By way of example, a possible method for training the neuronal network will be described below.

In order to train the neuronal network training data needs to be provided. Measuring training data, preferably comprises measuring directly or indirectly the element characteristic of the least one railroad element. The element characteristic of at least one railroad element (e.g. a position of a point on the railroad element) can be measured directly by e.g. measuring a position of a point on the railroad element by use of a laser sensor with very high accuracy. The change in the element characteristic can be provided for example by a vehicle travelling over the railroad element or using the railroad element.

The indirect measurement of an element characteristic of at least one railroad element (e.g. a position of a point on the railroad element) can be performed by measuring the motion characteristic of at least one railroad element with high accuracy, e.g. an acceleration with a very high precision acceleration sensor, such that the element characteristic can be calculated with sufficient accuracy on the basis of this high accuracy measurement using a model, e.g. double time integration of acceleration in case of position.

In addition, during the above direct or indirect measurement of the element characteristic, corresponding motion data is collected from the motion sensor provided on the railroad element.

Thus the motion data from the motion sensor (thus an input to the neuronal network) and the result to be obtained by a machine learning algorithm are measured at the same time. Thus such training data can be used to train the neuronal network (or a machine learning algorithm), wherein the training methods are known to the person skilled in the art.

Due to the possibility to map motion data collected from the motion sensor to any defined quantity with a functional relationship with respect to the motion data, it is possible to map motion data, e.g. time-dependent acceleration values, to a maintenance state indicator, for example indicative of the wear state of the railroad element, of an element of the railroad element or even a vehicle using the railroad element.

The following magnitudes specifying wear-states are provided for illustration purposes only.

In order to train the machine learning algorithm to map the measured motion data to a given maintenance state indicator indicative of a wear-state of the railroad element; the railroad element (here a rail or combination of rail and crosstie) needs to be provided in a wear state. For example the rail, the sensor is attached to or the rail attached to the crosstie carrying a motion sensor, may have bumps or undulations of 0.1 mm in a first case, 0.2 mm in a second case, 0.3 mm in a third case and so on.

Thus the training is carried out such that the element characteristic is provided at a given value (e.g. the magnitude of bumps or undulations) and in such a prepared setup, motion data is collected.

The motion sensor may measure time-dependent acceleration. And in the first case the machine learning algorithm is trained to map the motion data from the motion sensor to "bumps or undulations of 0.1 mm" in the first case, to map the motion data from the motion sensor to "bumps or undulations of 0.2 mm" in the second case, to map the motion data from the motion sensor to "bumps or undulations of 0.3 mm" in the third case, and so on. This mapping is believed to be based on the vibrations caused by the bumps or undulations.

Bumps or undulations of a certain magnitude may be regarded as representing a maintenance state indicator (e.g. the magnitude of the bumps or undulations; or "functional rail" for bumps or undulations smaller than 0.2 mm and "not functional rail" for bumps or undulations bigger than 0.2 mm) indicative of a wear-state of the railroad element (the bumps or undulations may be caused by abrasion due to friction, and thus wear). The change in the motion data can be caused by a railroad vehicle in a non-wear state (i.e. functioning with in the desired parameters).

Alternatively, the railroad element may be provided in a state corresponding to a non-wear state (i.e. functioning with in the desired parameters) in the change in the motion data can be caused by a vehicle in a wear state, which can be defined by a surface roughness or deviation from a circular shape of the wheel of the railroad vehicle of 0.1 mm in a first case, 0.2 mm in a second case and so on; or by a surface roughness or deviation from a circular shape of the wheel bearing of the railroad vehicle of 0.01 mm in a first case, of 0.02 mm in a second case and so on.

These deviations can be used in an analogous way with respect to the magnitude of the bumps and undulations in order to define a maintenance state indicator indicative of the wear state of the vehicle using the railroad element. The training of the machine learning algorithm can be carried out accordingly.

The invention claimed is:

1. Method for determining an element characteristic of a railroad element, comprising the steps of:
   providing a motion sensor on the railroad element;
   collecting motion data provided by the motion sensor, wherein the motion data is representing a motion characteristic of the railroad element different from the element characteristic;
   determining the element characteristic on the basis of the motion data, wherein the motion sensor provides motion data from a plurality of motion detectors of the motion sensor;
   wherein all motion detectors provide motion data representing a same motion characteristic, in particular acceleration or time dependent acceleration; and
   wherein at least one of the motion detectors has a different measuring range and/or a different resolution from another one of the motion detectors.

2. Method according to claim 1,
   wherein the railroad element is a crosstie of a rail or of a track switch, a rail, or/and
   wherein the motion characteristic of the railroad element is a characteristic of a point of the railroad element; or/and
   wherein the motion characteristic of the railroad element is selected from a group comprising: acceleration, time-dependent acceleration, velocity, time-dependent velocity, position and time-dependent position; or/and
   wherein the element characteristic of at least one railroad element is a characteristic of a point of the railroad element; and/or
   wherein the element characteristic of at least one railroad element is selected from a group comprising: position, time-dependent position, position deviation from a reference position or an equilibrium position, time-dependent position deviation from a reference position or an equilibrium position, and a maintenance state indicator.

3. Method according to claim 1, wherein the step of determining the element characteristic of a railroad element comprises the steps of
   obtaining processed motion data by processing motion data; and
   determining the element characteristic of at least one railroad element on the basis of the processed motion data.

4. Method according to claim 1, further comprising the steps of:
   providing at least one motion sensor on each railroad element of a plurality of railroad elements;
   collecting motion data provided by each of the motion sensors, wherein the motion data of each one of the motion sensors is representing a respective motion characteristic of the respective railroad element, the motion sensor is provided on,
   wherein the respective element characteristic of each one of the railroad elements represents a quantity different from the respective motion characteristic for the respective railroad element;
      determining a respective element characteristic of each one of the railroad elements on the basis of the respective motion data.

5. Method according to claim 1,
   wherein the element characteristic of the railroad element is a maintenance state indicator;
   wherein the step of determining an element characteristic of at least one railroad element comprises using a machine learning algorithm; and wherein
   the method further comprises the steps of:
      measuring reference data by providing a railroad element in a wear-state and providing a motion sensor on the railroad element in the wear-state and collecting corresponding motion data from the motion sensor on the railroad element in the wear-state, wherein the change in the motion data is caused by a vehicle using the railroad element; and
      using the reference data in the machine learning algorithm to determine the maintenance state indicator indicative of a wear state of the railroad element.

6. Method according to claim 1,
   wherein the element characteristic of the railroad element is a maintenance state indicator;
   wherein the step of determining an element characteristic of the railroad element comprises using a machine learning algorithm; and
   wherein the method includes a step of providing reference data by
      a) providing a vehicle in predetermined a wear-state, the vehicle being adapted to use the railroad element, and
      b) measuring corresponding motion data from a motion sensor provided on a railroad element, wherein the change in the motion data is caused by the vehicle in the wear-state using the railroad element; and
   wherein the machine learning algorithm uses the reference data to determine the maintenance state indicator indicative of a wear state of the vehicle.

7. Method according to claim 1,
   wherein the step of determining an element characteristic of at least one railroad element comprises using a machine learning algorithm.

8. Method according to claim 7, further comprising the steps of
   measuring reference data by measuring directly or indirectly the element characteristic of the railroad element and collecting corresponding data from the motion sensor on the at least one railroad element; and using the reference date in the machine learning algorithm.

* * * * *